A. JOHNSTONE.
COFFEE STEEP.
APPLICATION FILED OCT. 19, 1921.

1,400,749. Patented Dec. 20, 1921.

Inventor
ARTHUR JOHNSTONE

By *Beales Park*

Attorney

UNITED STATES PATENT OFFICE.

ARTHUR JOHNSTONE, OF OTTUMWA, IOWA.

COFFEE-STEEP.

1,400,749.

Specification of Letters Patent.

Patented Dec. 20, 1921.

Application filed October 19, 1921. Serial No. 508,695.

*To all whom it may concern:*

Be it known that I, ARTHUR JOHNSTONE, a citizen of the United States, residing at Ottumwa, in the county of Wapello and State of Iowa, have invented certain new and useful Improvements in Coffee-Steeps; and I hereby declare that the following is a full, clear, and exact description thereof, reference being had to the accompanying drawings, which form part of the specification.

My invention relates to an improved coffee steep for brewing coffee.

The object of my invention is to provide a steep so constructed that the coffee brew will consist only of the aromatic oils, and all deleterious by-products of the brew such as acids and like deposits will be separated and confined from mixing with the brew.

My invention chiefly consists in providing a double filter which serves to perfect the coffee brew; first by filtration of the coffee with boiling water and then filtering the product to a separator designed to intercept and retain the acids and other deleterious by-products while the perfect brew passes to the coffee pot or other vessel used to secure the perfect coffee brew. It will be seen that I provide for duplicate filtration, and also precipitation of the acids and deleterious by-products. I steep the coffee well with boiling water uniformly by confining the same in a limited space through which the boiling water passes resulting in the fullest extraction. Under the coffee container I provide a receptacle positioned below the coffee container designed to precipitate to its bottom the acids, etc., from the brew, the acids, etc., sinking to the bottom, while aromatic oils and coffee essence being of lighter specific gravity rise and escape through openings in the side wall of the receptacle above the bottom thereof. It will also be seen that I provide a coffee steep designed to be used independent of a coffee pot and adapted to be used over any suitable receptacle for holding the brew such for example as a cup, bowl or like article.

Figure 1:
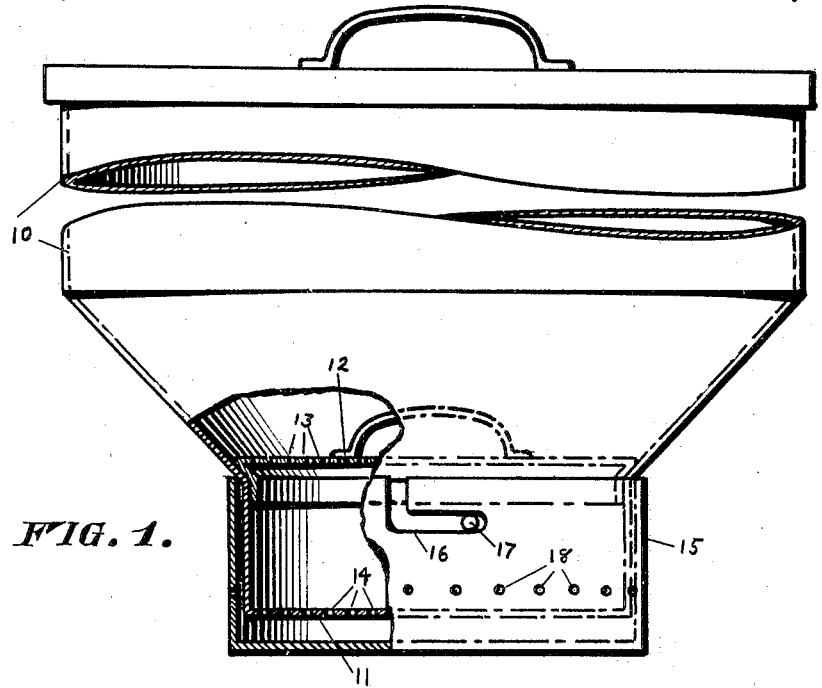
Figure 2:
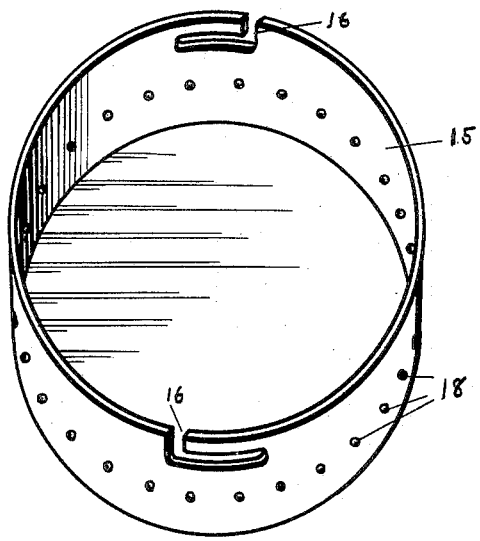

In the accompanying drawing Figure 1 is a front elevation of my invention partly in section. Fig. 2 is a perspective view of the lower strainer.

Referring more particularly to the drawings 10 denotes the hot water receptacle terminating in a coffee receptacle 11 formed integral therewith. 12 denotes a detachable cover for said receptacle provided with small perforations 13 which serve to gradually admit access of the boiling water in receptacle 10 to the coffee in receptacle 11. The bottom of receptacle 11 is provided with small openings 14 forming a strainer. 15 denotes a bottom strainer fitted to walls of the receptacle 11 by a bayonet joint 16 on each side which fasten into lugs 17 on the side walls of receptacle 11. 18 denotes small perforations in the side walls of receptacle 15 and serve as a second strainer, said perforations as shown in the drawings are positioned above the bottom of the receptacle. In operation boiling water is poured into receptacle 10 and passes through the perforations 13 in cover 12 and has access to the coffee. The coffee being well steeped the liquid or brew passes through the strainer holes 14 in the bottom of the coffee receptacle to the receptacle 15 supplying the same with the brew until it overflows through openings 18 into a coffee pot or other receptacle adapted to receive the brew strained of all acid and sediment, which by gravity fall to the bottom of receptacle 15.

Claims—

1. A coffee steep for brewing coffee consisting of a coffee strainer having a superincumbent hot water container and separated therefrom by detachable percolator, said coffee strainer having a perforated bottom and a precipitator having a closed bottom and strainer located in its side walls positioned above said perforated bottom.

2. A coffee steep for brewing coffee consisting of a coffee strainer having a superincumbent hot water container, said coffee strainer having a perforated bottom and a precipitation cup detachably attached thereto having a closed bottom and strainer located in its side walls positioned above said perforated bottom.

In testimony that I claim the foregoing as my own, I affix my signature.

ARTHUR JOHNSTONE.